United States Patent
Zhou et al.

(10) Patent No.: US 10,790,506 B2
(45) Date of Patent: Sep. 29, 2020

(54) SPHERICAL OR SPHERICAL-LIKE CATHODE MATERIAL FOR LITHIUM-ION BATTERY AND LITHIUM-ION BATTERY

(71) Applicant: Guizhou Zhenhua E-CHEM Inc., Guiyang (CN)

(72) Inventors: Chaoyi Zhou, Guiyang (CN); Zhu'an Yin, Guiyang (CN); Lijuan Wang, Guiyang (CN); Daixiang Yang, Guiyang (CN); Peng Peng, Guiyang (CN); Qianxin Xiang, Guiyang (CN); Ming Mei, Guiyang (CN); Lu Li, Guiyang (CN)

(73) Assignee: Guizhou Zhenhua E-CHEM Inc., Guiyang (CN)

( * ) Notice: Subject to any disclaimer, the term of this patent is extended or adjusted under 35 U.S.C. 154(b) by 90 days.

(21) Appl. No.: 16/022,757

(22) Filed: Jun. 29, 2018

(65) Prior Publication Data
US 2019/0020020 A1 Jan. 17, 2019

(30) Foreign Application Priority Data
Jul. 11, 2017 (CN) .......................... 2017 1 0562906

(51) Int. Cl.
*H01M 4/485* (2010.01)
*H01M 4/525* (2010.01)
(Continued)

(52) U.S. Cl.
CPC ............ *H01M 4/485* (2013.01); *C01G 53/50* (2013.01); *H01M 4/131* (2013.01); *H01M 4/505* (2013.01);
(Continued)

(58) Field of Classification Search
CPC ....... H01M 4/485; H01M 4/505; H01M 4/525
See application file for complete search history.

(56) References Cited

U.S. PATENT DOCUMENTS

2005/0014065 A1* 1/2005 Jung .................. H01M 4/505
429/231.1
2006/0194114 A1* 8/2006 Saito .................. H01M 4/131
429/232
(Continued)

FOREIGN PATENT DOCUMENTS

CN 101379637 A 3/2009
CN 102044672 A 5/2011
(Continued)

OTHER PUBLICATIONS

Korean Patent Application No. 10-2018-0075280, English translation of Office Action dated May 15, 2019, 12 pages.
(Continued)

*Primary Examiner* — Matthew J Merkling
(74) *Attorney, Agent, or Firm* — Lathrop GPM LLP (57) ABSTRACT

The present invention relates to a spherical or spherical-like cathode material for lithium-ion battery and a lithium-ion battery. The chemical formula of the cathode material is $Li_aNi_xCo_yMn_zM_bO_2$, wherein: $1.02 \leq a \leq 1.20$; $0.0 \leq b \leq 0.5$; $0.30 \leq x \leq 0.60$; $0.20 \leq y \leq 0.40$; $0.05 \leq z \leq 0.50$; $x+y+z=1$; M is one or two or more selected from the group consisting of Mg、Ti、Al、Zr、Y、Co、Mn、Ni、Ba and rare earth elements. Under the scanning electron microscope, the cathode material comprises primary particles with a morphology of spherical or spherical shape, and secondary particles agglomerated by the primary particles. The number percentage of the secondary particles agglomerated by the primary particles is less than or equal to 30%. The lithium battery prepared by the obtained cathode material has high specific capacity, high temperature stability, excellent safety and cycling performance at high temperature, and the preparation method thereof is simple and the cost is relatively low.

14 Claims, 2 Drawing Sheets

(51) Int. Cl.
*H01M 4/505* (2010.01)
*H01M 10/0525* (2010.01)
*C01G 53/00* (2006.01)
*H01M 4/131* (2010.01)
*H01M 4/02* (2006.01)

(52) U.S. Cl.
CPC ....... *H01M 4/525* (2013.01); *H01M 10/0525* (2013.01); *C01P 2002/60* (2013.01); *C01P 2002/72* (2013.01); *C01P 2004/03* (2013.01); *C01P 2004/32* (2013.01); *C01P 2004/62* (2013.01); *H01M 2004/028* (2013.01); *Y02E 60/122* (2013.01); *Y02T 10/7011* (2013.01)

(56) References Cited

U.S. PATENT DOCUMENTS

| | | | |
|---|---|---|---|
| 2007/0134558 A1* | 6/2007 | Fukunaga | H01M 4/364 429/329 |
| 2008/0160412 A1* | 7/2008 | Kasamatsu | H01M 2/1653 429/223 |
| 2009/0142663 A1* | 6/2009 | Takeuchi | H01M 10/0567 429/188 |
| 2009/0258296 A1* | 10/2009 | Kawasato | H01M 4/131 429/223 |
| 2012/0028128 A1* | 2/2012 | Seino | C01G 45/1228 429/304 |
| 2012/0183855 A1* | 7/2012 | Wohlfahrt-Mehrens | H01M 4/485 429/221 |
| 2012/0270093 A1* | 10/2012 | Isozaki | H01M 4/366 429/156 |
| 2014/0087262 A1* | 3/2014 | Imahashi | H01M 4/505 429/223 |
| 2015/0017537 A1* | 1/2015 | Hong | C01D 15/02 429/223 |
| 2016/0190585 A1* | 6/2016 | Yoon | H01M 4/485 429/231.5 |
| 2016/0218359 A1* | 7/2016 | Kim | H01M 4/485 |
| 2016/0308193 A1* | 10/2016 | Miyazaki | H01M 4/131 |
| 2017/0012286 A1* | 1/2017 | Washida | H01M 4/505 |
| 2017/0033354 A1* | 2/2017 | Ruan | H01M 4/366 |
| 2017/0062802 A1* | 3/2017 | Yang | H01M 4/525 |
| 2017/0069911 A1* | 3/2017 | Volkov | H01M 4/0471 |
| 2017/0288215 A1* | 10/2017 | Mitsumoto | H01M 10/0525 |
| 2018/0261842 A1* | 9/2018 | Park | C01G 53/66 |

FOREIGN PATENT DOCUMENTS

| | | |
|---|---|---|
| CN | 102077397 A | 5/2011 |
| CN | 102714313 A | 10/2012 |
| CN | 103782423 B | 5/2014 |
| CN | 104009217 A | 8/2014 |
| CN | 106532005 A | 3/2017 |
| KR | 10-2010-0063041 | 6/2010 |
| KR | 10-2011-0025669 | 3/2011 |
| KR | 10-2015-0006283 | 1/2015 |

OTHER PUBLICATIONS

Korean Patent Application No. 10-2018-0075280, Office Action dated May 15, 2019, 12 pages.
Japanese Patent Application No. 2018-130863, English translation of Office Action dated Jul. 16, 2019, 4 pages.
Japanese Patent Application No. 2018-130863, Office Action dated Jul. 16, 2019, 4 pages.
Chinese Patent Application No. 201710562906.6, English translation of Office Action dated May 13, 2019, 9 pages.
Chinese Patent Application No. 201710562906.6, Office Action dated May 13, 2019, 9 pages.
European Patent Application No. 18180773.6, Extended Search and Opinion dated Jan. 18, 2019, 6 pages.
Li et al. (2013) "Understanding Long-Term Cycling Performance of $Li_{1.2}Ni_{0.15}Mn_{0.55}Co_{0.1}O_2$-Graphite Lithium-Ion Cells," Journal of The Electrochemical Society, 160 (5), A3006-A3019.

* cited by examiner

Fig.2B

SPHERICAL OR SPHERICAL-LIKE CATHODE MATERIAL FOR LITHIUM-ION BATTERY AND LITHIUM-ION BATTERY

RELATED APPLICATIONS

This application claims priority to Chinese application serial no. 201710562906.6, filed Jul. 11, 2017, which application is hereby incorporated by reference in its entirety.

FIELD OF THE INVENTION

The present invention relates to the technical field of lithium-ion battery, specifically relates to a spherical or spherical-like cathode material for lithium-ion battery and lithium-ion battery.

BACKGROUND OF THE INVENTION

With the diversified development of power batteries which have been applied in many fields, the power batteries have become the focus and core of new energy vehicles. Mastering the power battery technology is tantamount to having the core advantage of the development of new energy vehicles. The most key indexes of the power batteries are concentrated in five aspects: safe and stable performance, cycle life, wide temperature resistance, charge speed and energy density. However, the improvement of the performance of the five aspects of lithium-ion battery depends largely on the properties of the cathode material.

At present, the commonly used cathode materials for lithium-ion battery are: 1) lithium-manganese composite oxide of spinel structure, which is cheap and easy to synthesize and the obtained battery has an excellent safety performance, but has low specific capacity and poor high temperature cycling performance and storage performance; 2) lithium iron phosphate composite oxide of olivine structure, which has a stable safety performance, good high temperature performance and light weight but has low specific capacity and poor low temperature performance; 3) the conventional layered lithium nickel composite oxide, which has the advantages of high specific capacity and good thermal stability, however the structure of which becomes very fragile when the delithiated amount is large, and the active metal and oxygen in the crystal lattice are displaced. The atomic rearrangement and reconstruction gradually increase when the reaction conditions reached a certain high temperature and pressure, and the grain size and phase change a lot. On the other hand, chemical reaction or electrochemical reaction with electrolyte causes deoxidation of the material easily and dissolution of the transition metal. Particularly, at high voltage, the electrolyteis oxidized to produce $H^+$, which increases the acidity of the electrolyte and thereby the surface film of the electrode material is destroyed by HF. The composition and structure of the interface are further changed, which seriously affect the electrochemical properties and cycling performance of the material.

In order to solve the above problems, the lithium nickel composite oxide is subject to bulk doping and surface coating modification, which is an effective method of improvement. Bulk doping of the lithium nickel composite oxide can effectively suppress the structural change, enhance the reversibility of the material, and inhibit the increase of the charge transfer resistance in the cyclic progress. Surface coating modification of the lithium nickel composite oxide can effectively avoid direct contact between the material and electrolyte, especially HF in the electrolyte, thereby preventing the occurrence of by-reaction and inhibiting crystal phase transition of the material, thereby increasing safety, cycle stability and rate capability of the material.

It has been reported in Chinese patent application No. 200780004424.3, publication No. CN101379637A, entitled "Lithium transition metal-based compound powder for cathode material in lithium secondary battery, method for manufacturing the powder, spray dried product of the powder, firing precursor, positive electrode for lithium secondary battery using the lithium transition metal-based compound powder, and lithium secondary battery" that, the lithium nickel manganese cobalt-based composite oxide powder for a lithium secondary battery cathode material of the patent, in the powder X-ray diffraction, the FWHM of the (110) diffraction peak at a diffraction angle 2θ of about 64.5° is in the range of 0.01 to 0.2. It has been reported in the Chinese patent application No. 201010565957.2, publication No. CN102044672A, entitled "Lithium transition metal-based compound powder for cathode material in lithium secondary battery" that, the cathode material for the lithium secondary battery in the patent is lithium transition metal-based compound powder, and at least one or more additives (the additive contains oxide of at least one element selected from the group consisting of Mo, W, Nb, Ta and Re) for suppressing grain growth and sintering were added to the main ingredient raw material and the ratio of the additive amount to the total molar amount of the transition metal element in the main ingredient raw material is more than 0.01 mol % and less than 2 mol %, and then calcined. In the powder X-ray diffraction of the lithium transition metal-based compound powder for the cathode material of the battery in the patent, the FWHM of the (110) diffraction peak at a diffraction angle 2θ of about 64.5° is in the range of 0.01 to 0.2. And in the (018) diffraction peak at a diffraction angle 2θ of about 64°, (110) diffraction peak near a diffraction angle of 64.5° and (113) diffraction peak near a diffraction angle of 68°, where respective apex of a high-angle side peak having a diffraction peak caused by multiphase, the integrated intensity ratio of the diffraction peak of the multiphase peak to the integrated intensity of the diffraction peak of the crystal phase of the original are respectively: 0≤I018*/I018≤0.2, 0≤I110*/I110≤0.2, 0≤I113*/I113≤0.2. It has been reported in the Chinese patent application No. 201180005492.8, publication No. CN102714313A, entitled "power for lithium secondary battery cathode material, method for producing the same, positive electrode for lithium secondary battery and lithium secondary battery using the same" that, the lithium transition metal-based compound power for the lithium secondary battery cathode material in this patent is composed of secondary particles, the secondary particles are formed by primary particles having two or more compositions, and the primary particles of a compound having at least one element selected from the group consisting of As, Ge, P, Pb, Sb, Si and Sn are contained in the structural formula in at least inner portions of the secondary particles. In the powder X-ray diffraction measurement of using CuKα radiation, the lithium transition metal-based compound powder has a FWHM of a diffraction peak at a diffraction angle 2θ of about 64.5° satisfying a relationship of 0.01≤FWHM≤0.5. It has been reported in Chinese patent application No. 201280043469.2, Publication No. CN103782423B, entitled "cathode active material for non-aqueous electrolyte secondary battery and non-aqueous electrolyte secondary battery" that, the cathode active material of the non-aqueous electrolyte secondary battery (1) contains a first cathode active material and a second cathode active material. The cobalt content of the first cathode active material is 15% or more based on the atomic percentage of the transition metal, and The cobalt content of the second cathode active material is 15% or less based on the atomic percentage of the transition metal. The average secondary particle diameter r1 of the first cathode active material is smaller than the average secondary particle diameter r2 of the second cathode active material. In the powder X-ray diffraction measurement using CuKα radiation, the full width at half maximum of the diffraction peak (110) of the first and second cathode active materials at a diffraction angle 2θ within a range of 64.5°±1.0° is 0.1≤FWHM110≤0.3.

SUMMARY OF THE INVENTION

The technical problem to be solved by the present invention is that the prior art, including the above patents, does not point out what kind of morphology of cathode material for lithium ion battery, what range of FWHM of (110), (104), (101) and (107) in the powder X-ray diffraction spectrum, what crystalline grain size of (104) and (107) and what range of ratio of FWHM of (003) to FWHM of (104) of a cathode material of lithium-ion battery which has a high specific capacity, high stability, excellent safety performance and cycling performance at elevated temperature. And at present, the high temperature storage performance of the cathode material of lithium-ion battery needs to be improved. In addition, the present inventors have found that the order of addition the M source in the preparation method affects the properties of the cathode material in varying degrees. How to prepare the above-mentioned cathode material with high specific capacity, high stability and safety, and excellent cycling performance at elevated temperature is also one of the problems to be solved by the present invention.

That is, the object of the present invention is to provide a spherical or spherical-like layered cathode material for lithium-ion battery which has a rounded surface, structural integrity, excellent process ability, and thereby being convenient for industrialized production.

In order to solve the above-mentioned technical problems, the present invention provided a spherical or spherical-like cathode material for lithium ion battery and preparation method and application thereof. The chemical formula of the cathode material is $Li_aNi_xCo_yMn_zM_bO_2$, wherein 1.02≤a≤1.20; 0.0≤b≤0.5; 0.30≤x≤0.60; 0.20≤y≤0.4; 0.05≤z≤0.50; M is one or two or more selected from the group consisting of Mg, Ti, Al, Zr, Y, Co, Mn, Ni, Ba and rare earth elements. Under the scanning electron microscope, the above cathode material comprises primary particles with a morphology of spherical or spherical-like shape, and secondary particles agglomerated by the primary particles. In the X-ray diffraction spectrum, the ratio of FWHM (003) of the (003) diffraction peak at a diffraction angle 2θ of about 18.7° to FWHM (104) of the (104) diffraction peak at a diffraction angle 2θ of about 44.5° is in the range of 0.90 to 1.50. The cathode material provided by the present invention is easy to industrialization, low in production cost and excellent cycling performance, storage performance and safety performance under high voltage. And the cathode material is suitable for digital, communication, electric power, energy storage system and xEV type power batteries.

Specifically, in view of the deficiencies of the prior art, the present invention provides the following technical solutions:

A spherical or spherical-like cathode material for lithium-ion battery, characterized in that, the chemical formula of the cathode material is $Li_aNi_xCo_yMn_zM_bO_2$, wherein: 1.02≤a≤1.20; 0.0≤b≤0.5; 0.30≤x≤0.60; 0.20≤y≤0.40; 0.05≤z≤0.50; x+y+z=1; M is one or two or more selected from the group consisting of Mg、Ti、Al、Zr、Y、Co、Mn、Ni、Ba and rare earth elements. Under the scanning electron microscope, the cathode material comprises the primary particles with a morphology of spherical or spherical-like shape, and the secondary particles agglomerated by the primary particles; the number percentage of the secondary particles agglomerated by the primary particles is less than or equal to 30%.

Preferably, in the above cathode material, 0≤b≤0.1, preferably 0≤b≤0.05, and more preferably, 0≤b≤0.01.

Preferably, in the above cathode material, under the scanning electron microscope, the cathode material comprises the primary particles with a morphology of spherical or spherical-like shape, and the secondary particles agglomerated by the primary particles; wherein, the number percentage of the secondary particles agglomerated by the primary particles is less than or equal to 30%, preferably less than or equal to 20%, and more preferably less than or equal to 10%.

Preferably, in the above cathode material, the number percentage of the secondary particles agglomerated by the primary particles is more than 0, preferably more than 5%.

Preferably, in the above cathode material, wherein, in the powder X-ray diffraction spectrum of the cathode material, full width at half maximum FWHM (110) of (110) diffraction peak at a diffraction angle 2θ of about 64.9° is 0.07 to 0.13.

Preferably, in the above cathode material, wherein, in the powder X-ray diffraction spectrum of the cathode material, full width at half maximum FWHM (104) of (104) diffraction peak at a diffraction angle 2θ of about 44.5° is 0.06 to 0.105, and a crystalline grain size is greater than 1100 Å and less than 2000 Å.

Preferably, in the above cathode material, wherein, in the powder X-ray diffraction spectrum of the cathode material, full width at half maximum FWHM (107) of (107) diffraction peak at a diffraction angle 2θ of about 58.7° is 0.065 to 0.12, and a crystalline grain size is greater than 1000 Å and less than 3000 Å.

Preferably, in the above cathode material, wherein, in the powder X-ray diffraction spectrum of the cathode material, the ratio of full width at half maximum FWHM (003) of (003) diffraction peak at a diffraction angle 2θ of about 18.7° to full width at half maximum FWHM (104) of (104) diffraction peak at a diffraction angle 2θ of about 44.5° is in the range of 0.90 to 1.50.

Preferably, in the above cathode material, wherein, in the powder X-ray diffraction spectrum of the cathode material, full width at half maximum FWHM (101) of (101) diffraction peak at a diffraction angle 2θ of about 36.7° is 0.05 to 0.10.

The present invention also provided a preparation method of the above spherical or spherical-like cathode material for lithium battery, characterized in that it comprises the following steps:

(1) dissolving compounds containing M element in an aqueous solution to form a first solution;

(2) dispersing lithium source in polyethylene glycol water-based colloid to form a second solution;

(3) mixing nickel-cobalt-manganese precursor with the first solution and the second solution to obtain a mixture;

(4) sintering the mixture at 700 to 1080° C., and pulverizing and classifying the mixture to obtain the spherical or spherical-like cathode material for lithium battery.

Preferably, in the above preparation method, the pulverization pressure in step (4) is 0.2 Mpa-0.9 Mpa.

Preferably, in the above preparation method, the aqueous solution in step (1) is cetyltrimethyl ammonium bromide solution, and the concentration of which is 1 wt %~5 wt %.

Preferably, in the above preparation method, the concentration of the polyethylene glycol water-based colloid in step (2) is 1 wt %~5 wt %. The ratio of the lithium source to the polyethylene glycol water-based colloid is (1-5) g/ml. The ratio of the M element to the cetyltrimethyl ammonium bromide solution is (0-0.8) g/ml.

Preferably, in the above preparation method, after dispersing the lithium source in the polyethylene glycol water-based colloid in step (2), the method further comprises a stirring step, wherein the stirring speed is 200-500 r/min, and the stirring time is 20-50 min.

Preferably, in the above preparation method, the sintering time is 6-30 hours, preferably 8-24 hours.

Preferably, in the above preparation method, wherein the sintering process comprises the following steps:

after sintering at 700-850° C. for 2-5 hours, sintering at 900-1080° C. for another 2-25 hours.

Preferably, in the above preparation method, the sintering step comprises the following steps: after sintering at 800-850° C. for 2-5 hours, sintering at 900-980° C. for another 2-25 hours.

Preferably, in the above preparation method, the lithium source is one or two or more selected from the group consisting of lithium carbonate, lithium hydroxide monohydrate, lithium oxide and lithium acetate.

Preferably, in the above preparation method, the nickel-cobalt-manganese precursor is selected from nickel-cobalt-manganese hydroxides and/or nickel-cobalt-manganese oxides.

The present invention also provides a cathode material for lithium-ion battery obtained by the method aforementioned.

The present invention also provides a lithium-ion battery, characterized in that the battery comprises the cathode material or the cathode material prepared by the above methods.

The present invention also provides a communication, electric power, energy storage system or a mobile storage device, characterized in that, it is prepared by the above lithium-ion battery.

The present invention also provides an application of the above lithium-ion cathode material or the lithium-ion battery in the field of mobile digital products, communication, electric power, energy storage system or xEV type lithium-ion power battery.

The advantages of the present invention are: the lithium battery prepared by the lithium-ion cathode material of the present invention has high specific capacity, high temperature stability, safety and excellent cycling performance at high temperature, and the preparation method thereof is simple. The preparation process is easy to control and operate, and the production cost is low.

DESCRIPTION OF THE PREFERRED EMBODIMENTS

In view of the specific capacity, high temperature stability, and cycling performance of the current lithium-ion cathode material need to be improved, the present invention provides a spherical or spherical-like cathode material for lithium-ion battery and a lithium-ion battery.

In a preferred embodiment, the present invention provides a lithium-ion cathode material with homogeneous morphology, good structural integrity, simple process, good material consistency and superior material recycling performance, and thereby being convenient for mass production.

Specifically, the present invention provides a spherical or spherical-like layered cathode material for lithium-ion battery, which is characterized in that the chemical formula of the cathode material is:

$Li_aNi_xCo_yMn_zM_bO_2$, wherein: $1.02 \leq a \leq 1.20$; $0.0 \leq b \leq 0.5$; $0.30 \leq x \leq 0.60$; $0.20 \leq y \leq 0.40$; $0.05 \leq z \leq 0.50$; $x+y+z=1$; M is one or two or more selected from the group consisting of Mg、Ti、Al、Zr、Y、Co、Mn、Ni、Ba and rare earth elements.

Preferably, under the scanning electron microscope, the cathode material comprises the primary particles with a morphology of spherical or spherical-like shape, and the secondary particles agglomerated by the primary particles; the number percentage of the secondary particles agglomerated by the primary particles is less than or equal to 30%, preferably less than or equal to 20%, and more preferably less than or equal to 10%.

Preferably, the powder X-ray diffraction spectrum (XRD) of the cathode material indicates that the material is a single α-NaFeO$_2$ type layered structure, and full width at half maximum FWHM (110) of (110) diffraction peak at a diffraction angle 2θ of about 64.9° is 0.07-0.13.

Preferably, the powder X-ray diffraction spectrum (XRD) of the cathode material indicates that the material is a single α-NaFeO$_2$ type layered structure, and full width at half maximum FWHM (104) of (104) diffraction peak at a diffraction angle 2θ of about 44.5° is 0.06-0.13, and a crystalline grain size is greater than 1100 Å and less than 2000 Å.

Preferably, the powder X-ray diffraction spectrum (XRD) of the cathode material indicates that the material is a single α-NaFeO$_2$ type layered structure, and full width at half maximum FWHM (101) of (101) diffraction peak at a diffraction angle 2θ of about 36.7° is 0.05-0.10.

Preferably, the powder X-ray diffraction spectrum (XRD) of the cathode material indicates that the material is a single α-NaFeO$_2$ type layered structure, and full width at half maximum FWHM (107) of (107) diffraction peak at a diffraction angle 2θ of about 58.7° is 0.065-0.12, and a crystalline grain size is greater than 1000 Å and less than 3000 Å.

Preferably, the powder X-ray diffraction spectrum (XRD) of the cathode material indicates that the material is a single α-NaFeO$_2$ type layered structure, and the ratio of full width at half maximum FWHM (003) of (003) diffraction peak at a diffraction angle 2θ of about 18.7° to full width at half maximum FWHM (104) of (104) diffraction peak at a diffraction angle 2θ of about 44.5° is in the range of 0.90 to 1.50.

The preparation method of the spherical or spheroidal layered cathode material for lithium-ion battery in the present invention at least comprises the following steps:

1) dissolving M source (M is 0.0-0.5 mol) in aqueous solution to form solution A.

2) dispersing lithium source (Li is 1.02-1.25 mol) in polyethylene glycol water-based colloid and stirring to form solution B.

3) adding the solution B formed by the above step 2) to a container and stirring, then adding a nickel-cobalt-manganese precursor and stirring, finally adding solution A of step 1) to the container and stirring continuously to obtain a mixture of lithium-nickel-cobalt-manganese.

4) sintering the mixture of lithium-nickel-cobalt-manganese of step 3) at 700~1080° C., cooling, pulverizing and classifying the mixture to obtain the spherical or spherical-like cathode material for lithium-ion battery.

Preferably, wherein the sintering time is 6-30 hours, preferably the sintering time is 8-24 hours.

Preferably, in the above preparation method of the cathode material, wherein, the lithium source used is lithium carbonate, lithium hydroxide monohydrate, lithium nitrate, lithium acetate, or mixtures thereof.

Preferably, in the above preparation method of the cathode material, wherein, the nickel-cobalt-manganese precursor used is nickel-cobalt-manganese hydroxides, nickel-cobalt-manganese oxides, or mixtures thereof.

The present invention provides a cathode material for lithium-ion battery obtained by any of the above preparation methods.

The present invention also provides a cathode material for lithium-ion battery comprising any of the above features.

The present invention also provides a lithium-ion battery, characterized in that, it comprises at least one cathode material of any of the above features using as a positive electrode active material.

The present invention also provides a communication, electric power, energy storage system or a mobile storage device, characterized in that it is prepared by using the above lithium-ion battery.

The present invention also provides an application of the lithium-ion battery in the field of mobile digital products, communication, electric power, energy storage system or xEV type lithium-ion power battery.

The preparation method of the present invention is simple. The preparation process is easy to control and operate, and the production cost is low.

In another preferred embodiment, the spherical or spheroidal layered cathode material for lithium-ion battery according to the present invention are obtained by the method at least comprising the following steps:

1) dissolving M source (M is 0.0-0.5 mol) in aqueous solution to form solution A.

2) dispersing lithium source (Li is 1.02-1.25 mol) in polyethylene glycol water-based colloid, and stirring at a certain rotation speed for a period of time to form solution B.

3) adding the solution B formed by the above step 2) to a container and stirring, then adding a nickel-cobalt-manganese precursor and stirring for 30-60 min, finally adding solution A of step 1) and stirring continuously for 10-30 min to obtain a mixture of lithium-nickel-cobalt-manganese.

4) sintering the mixture of lithium-nickel-cobalt-manganese of step 3) at 700-1080° C., cooling, pulverizing and classifying the mixture to obtain the spherical or spherical-like cathode material for lithium-ion battery.

In the above method, the aqueous solution of step (1) is surfactant cetyltrimethyl ammonium bromide solution; when dispersing in step 2), the mass concentration of the polyethylene glycol water-based colloid is 1-5%, stirring speed is 200-500 r/min, and stirring time is 20-50 min; sintering time of step 4) is 6-30 hours, preferably 8-24 hours.

The crystalline grain size described in the present invention is average thickness of the grains perpendicular to the direction of crystal plane.

A scanning electron microscope observation shows that the primary particles described in the present invention are single particles. The secondary particles agglomerated by the primary particles are particles formed by agglomeration of at least two single particles by the action of intermolecular forces or chemical bonds under a scanning electron microscope.

In the present invention, the number percentage of the secondary particles agglomerated by greater than or equal to two primary particles is defined as follows, under a scanning electron microscope with a magnification of 3000 times, randomly extracting three images, and randomly selecting a SEM image from every image wherein the selected SEM image has an area which is larger than 80% of the entire image area and has a total number of greater than 50 particles, dividing number of the secondary particles by the total number of particles and multiplying by 100% to obtain the number percentage of the secondary particles, then calculating the average of the three images.

The sintering equipment used in the examples: muffle furnace of Foshan New Porcelain Furnace Co., Ltd.

Pulverizing equipment: SHQM type of dual planetary ball mill, Lianyungang Chunlong Experimental Instrument Co., Ltd.; Pulverizing: MX-50 airflow pulverizer of Yixing Juneng Milling Equipment Company.

Analytical instruments: X'pert PRU X-ray diffractometer of Netherlands Panne with a target of Cukα, a wavelength of 1.54 Å, a test voltage of 40 kV, a test current of 40 mA and a step of 0.013°; LIP-3AHBO6 high temperature formation system of Zhejiang Hangke; CT2001C Test Equipment of Wuhan LAND electronics; KP-BAK-03E-02 efficient vacuum oven of Kerui Electrical, Dongguan City. Scanning electron microscope: Manufacturer: Germany Zeiss, type: SUPRA55SAPPHIRE field emission scanning electron microscope.

The lithium-ion secondary battery of the present invention is composed of an electrode, a non-aqueous electrolyte, a separator and a container. Specifically, the electrode includes a positive electrode and a negative electrode. The positive electrode is made of materials comprising a positive electrode current collector and a positive electrode active material coated on the positive electrode current collector, and a conventional adhesive, a conventional conductive additive or the like, wherein the positive electrode active material is the spherical or spherical-like cathode material for lithium-ion battery of the present invention. The negative electrode is made of materials comprising a current collector and a conventional negative electrode active material coated on the current collector, as well as conventional adhesives, conventional conductive additive or the like. The separator is PP/PE film conventionally used in the industry for separating the positive and negative electrodes from each other. The container is a containing object of a positive electrode, a negative electrode, a separator and an electrolyte.

In the following examples, the specific method of making the secondary lithium-ion button battery of the spherical or spherical-like layered cathode material prepared by the present invention is as follows:

Preparation of a positive electrode: the spherical or spherical-like layered cathode material for lithium-ion battery of the present invention, conductive carbon black (SP) and binder polyvinylidene fluoride (PVDF) were added into N-methylpyrrolidone (NMP) (weight ratio of lithium-nickel-cobalt-manganese cathode material to NMP is 2.1:1) in a weight ratio of 90:5:5, and then mixed the materials thoroughly. The mixture was stirred to form a homogeneous slurry. Then the slurry was coated on an aluminum foil current collector, dried and pressed to form a positive electrode. The pressed positive electrode was punched, weighed and baked, and then the battery was assembled in a vacuum glove box. First put the bottom shell of the battery, then put the foam nickel (2.5 mm) on the bottom shell, then put the negative metal lithium (Tianjin production, 99.9%) on the foam nickel, then injected 0.5 g of electrolyte solution onto the negative in the environment with relative humidity of less than 1.5%, wherein the electrolyte solution used a mixed solvent of EC, DEC, and DMC with a mass ratio of 1:1:1, and the electrolyte was 1M lithium hexafluorophosphate. Then put the separator, the positive electrode and the button battery cover in turn, and finally sealed the battery. The button battery model is CR2430.

In the following examples, the specific method of making the lithium-ion secondary button battery of the spherical or spherical-like layered cathode material for lithium-ion battery prepared by the present invention is as follows:

Preparation of a positive electrode: the spherical or spherical-like layered cathode material for lithium-ion battery of the present invention, conductive carbon black (SP) and binder polyvinylidene fluoride (PVDF) were added into N-methylpyrrolidone (NMP) (weight ratio of lithium-nickel-cobalt-manganese cathode material to NMP is 2.1:1) in a weight ratio of 94:3:3, and then mixed the materials thoroughly. The mixture was stirred to form a homogeneous slurry. Then the slurry was coated on an aluminum foil current collector, dried and pressed to form a positive electrode.

Preparation of a negative electrode: added the negative artificial graphite, conductive carbon black (SP), carboxymethyl cellulose (CMC) and adhesive (SBR) with a weight ratio of 95:1:1:3 were added to a sufficient amount of pure water, and mixed the materials. The mixture was stirred to form a homogeneous slurry. Then the slurry was coated on a copper foil collector, dried and pressed to form a negative electrode.

The separator is PP/PE composite film material. The pressed positive and negative electrode were welded a tab-lead. After inserted the separator between the positive and the negative electrode, the materials were rolled in the winding machine and then put into the soft package fixture, and then sealed the top and side of the soft package. Then the soft package were baked in a oven. And then 9 g of the electrolyte solution was injected into the soft package in an environment where the relative humidity was less than 1.5%. The electrolyte solution used a mixed solvent of DE, DEC and DMC with a mass ratio of EC:DEC:DMC=1:1:1. The electrolyte was 1M lithium hexafluorophosphate. After liquid injection and formation for 48 hours, the soft package was evacuated and sealed. The battery model was 454261.

The charging and discharging test of the lithium-ion secondary experiment battery prepared by the present invention was carried out on Wuhan blue battery tester according to the test method of GB/T18287-2000.

High temperature storage performance test: set the temperature of constant temperature oven at 85° C., full charged and storage for 4 h, and tested the battery voltage, internal resistance and thickness changes before and after the storage. The instruments used were: Programmable incubator, Manufacturer: Dongguan Guangbo Testing Equipment Co., Ltd., Model: GK-HP1008; Battery resistance tester, manufacturer: Shenzhen and Putaike Electronics Co., Ltd., Model: HK3562, Spiral micrometer, Manufacturer: Deqing Sheng Tai Electronics Technology Co., Ltd.

The cathode material, the preparation method and the application thereof of the present invention is described below through specific embodiments.

The reagents used in the following examples are shown in Table 1.

TABLE 1 the reagent information of examples in the present invention

| Reagent name | Grade | Model | Manufacture |
|---|---|---|---|
| nano aluminum oxide | ceramics grade | — | Anhui Xuancheng Jingrui New Materials Co., Ltd |
| ammonium metatungstate | ceramics grade | — | Anhui Xuancheng Jingrui New Materials Co., Ltd |
| nano magnesium oxide | ceramics grade | — | Anhui Xuancheng Jingrui New Materials Co., Ltd |
| nano zirconium dioxide | ceramics grade | — | Anhui Xuancheng Jingrui New Materials Co., Ltd |
| ammonium heptamolybdate | ceramics grade | — | Anhui Xuancheng Jingrui New Materials Co., Ltd |
| lithium hydroxide monohydrate | battery grade | 99.5 wt % | Jiangxi Ganfeng Lithium Co., Ltd. |
| lithium carbonate | battery grade | 99.5 wt % | Jiangxi Ganfeng Lithium Co., Ltd. |
| nickel/cobalt/manganese 333 | $Ni_{1/3}Co_{1/3}Mn_{1/3}(OH)_2$ | — | Guangdong Jiana Energy Technology Co., Ltd |
| nickel/cobalt/manganese 433 | $Ni_{0.4}Co_{0.3}Mn_{0.3}(OH)_2$ | — | Guizhou Zhenhua New Materials Co., Ltd. |
| nickel/cobalt/manganese 523 | $Ni_{0.5}Co_{0.2}Mn_{0.3}(OH)_2$ | — | Guangdong Jiana Energy Technology Co., Ltd |
| nickel/cobalt/manganese 622 | $Ni_{0.6}Co_{0.2}Mn_{0.2}(OH)_2$ | — | Guangdong Jiana Energy Technology Co., Ltd |
| polyethylene glycol | premium grade | — | Guangdong Zhongpeng Chemical Co., Ltd. |

TABLE 1-continued the reagent information of examples in the present invention

| Reagent name | Grade | Model | Manufacture |
|---|---|---|---|
| cetyltrimethyl ammonium bromide | — | — | Guangzhou Quanteng Chemical Co., Ltd. |
| High-purity oxygen | industrial grade | purity of 99.95% | Shenzhen Nanshan gas station |
| conductive carbon black | battery grade | Super P Li | Swiss Timcal company |
| N-methylpyrrolidone | battery grade | content of 99.5% | Jiangsu Nanjing, Jinlong Chemical Factory |
| Polyvinylidene fluoride | battery grade | Solef 6020 | US Solvay Chemical Company |
| Aluminum foil | battery grade | thickness of 16 μm | American Aluminum Company |
| electronic tape | electronic level | green, width: 10 mm | American 3M company |
| lithium sheet | electronic level | diameter: Φ20 mm, purity ≥99.9% | Shanghai Shunyou Metal Materials Co., Ltd. |
| electrolyte solution | electronic level | LIB301, dimethyl carbonate (DMC):ethylene carbonate (EC):diethyl carbonate (DEC) = 1:1:1(volume), lithium salt LiPF6 concentration: 1 mol/L | Shenzhen CAPCHEM Technology Co. Ltd |
| separator | — | PP/PE/PP three-layer material, Celgard M825, thickness: 16 μm. | American Celgard Company |
| aluminum/plastic film | industrial grade | total thickness: 16 μm | Japan DNP company |

EXAMPLE 1

1) 5 g of aluminum oxide powder was dissolved in 10 ml aqueous solution of 1 wt % surfactant cetyltrimethyl ammonium bromide to form a first solution.

2) 441.5 g of lithium carbonate was dispersed into 300 ml polyethylene glycol water-based colloid with a mass concentration of 5%, and stirred for 20 min at a rotation speed of 200 r/min to form a second solution.

3) the second solution formed by the above step 2) was added to a container and stirred, then added 1000 g of NiCoMn523 hydroxide and stirred for 30 min at a rotation speed of 400 r/min, finally added the first solution of step 1) to the container and stirred continuously for 30 min, and a mixture containing elements of lithium, nickel, cobalt, manganese and aluminum was obtained.

4) Under air atmosphere, the mixture containing elements of lithium, nickel, cobalt, manganese and aluminum of step 3) was heated from room temperature by temperature elevation for 3 h to 800° C. to sinter for 3 h, and then heated by temperature elevation for 1 h to 980° C. to sinter for 5 h. The mixture was naturally cooled to room temperature. Then the mixture was crushed and classified at an air pressure of 0.1 Mpa, and then the mixture was sieved with a 325 mesh metal sieve(GBT6003.1-1997) to obtain spherical or spherical-like layered cathode material for lithium-ion battery C1.

Figure 1A:
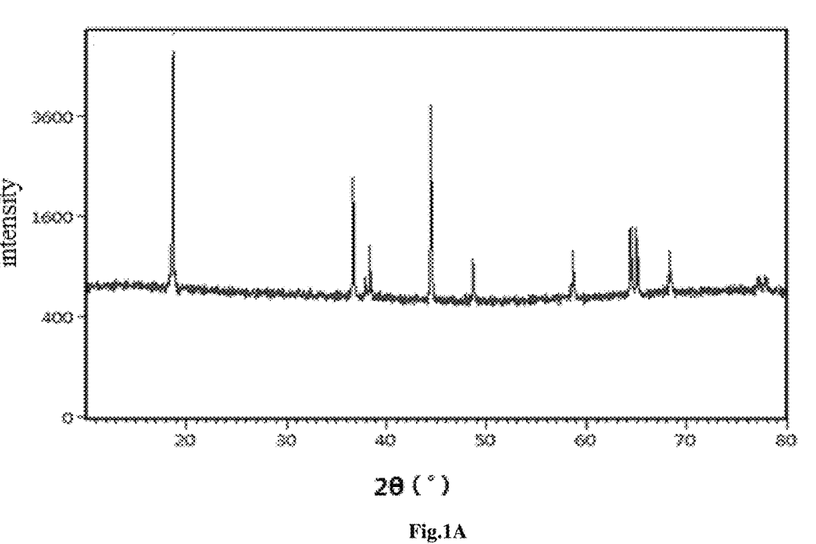
FIG. 1A is an X-ray spectrum of the cathode material of example 1.

The powder of the cathode material C1 was subjected to X-ray diffraction test, as shown in FIG. 1A. The test results showed that full width at half maximum FWHM (110) of (110) diffraction peak at a diffraction angle 2θ of about 64.92° was 0.13. Full width at half maximum FWHM (104) of (104) diffraction peak at a diffraction angle 2θ of about 44.41° was 0.06, the crystalline grain size was 1100 Å, and full width at half maximum FWHM (101) of (101) diffraction peak at a diffraction angle 2θ of about 36.64° was 0.07, full width at half maximum FWHM (107) of (107) diffraction peak at a diffraction angle 2θ of about 58.61° was 0.065, the crystalline grain size was 1000 Å. The ratio of full width at half maximum FWHM (003) of (003) diffraction peak at a diffraction angle 2θ of about 18.68° to full width at half maximum FWHM (104) of (104) diffraction peak at a diffraction angle 2θ of about 44.41° was 0.90.

Specifically, the conditions (sintering temperature, sintering time, and product) corresponding to the sintering step of the cathode material C1 were summarized in Table 1, as shown in Table 1.

Figure 1B:
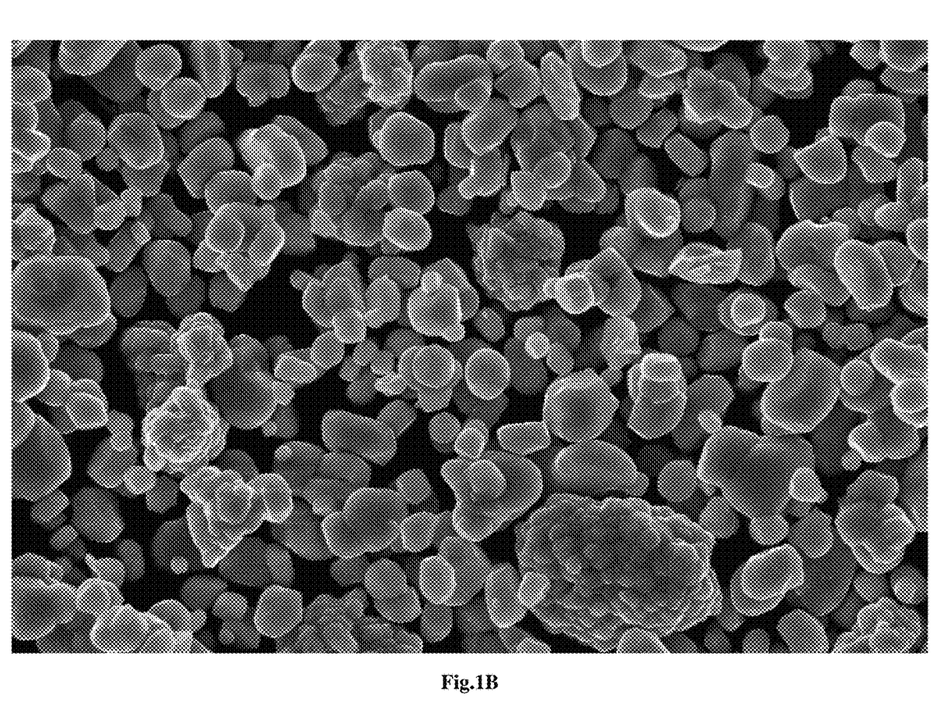
FIG. 1B is a SEM photograph of the cathode material of example 1, which the magnification is 3,000 times.

The cathode material C1 was subjected to a scanning electron microscope test. As shown in FIG. 1B, the particles were found to be spherical or spherical-like shape, comprising primary particles and secondary particles agglomerated by the primary particles. The number percentage of the secondary particles agglomerated by the primary particles is 25%.

The index data of the cathode material C1 (full width at half maximum (FWHM) of diffraction angle of (110) crystal plane in X-ray diffraction, diffraction angle of (003) plane, full width at half maximum of diffraction angle of (104) crystal plane and crystalline grain size, full width at half maximum of diffraction angle of (101) crystal plane, full width at half maximum of diffraction angle of the (107) crystal plane and the crystalline grain size, the ratio of FWHM (003)/FWHM (104)) were shown in Table 2. The performance test results of the battery using the powder C1 as the active material of the cathode material were shown in Table 3.

EXAMPLE 2

1) 456.7 g of lithium carbonate was dispersed into 100 ml polyethylene glycol water-based colloid with a mass concentration of 3%, and stirred for 35 min at a rotation speed of 250 r/min to form a second solution.

2) the second solution formed by the above step 1) was added to a container and stirred, then added 1000 g of NiCoMn333 hydroxide and stirred continuously for 40 min at a rotation speed of 100 r/min, and a mixture containing lithium, nickel, cobalt and manganese was obtained.

3) Under air atmosphere, the mixture containing lithium, nickel, cobalt and manganese of step 2) was heated from room temperature by temperature elevation for 2 h to 700° C. to sinter for 5 h, and then heated by temperature elevation for 2 h to 940° C. to sinter for 19 h. The mixture was naturally cooled to room temperature. Then the mixture was crushed and classified at an air pressure of 0.3 Mpa, and then the mixture was sieved with a 325 mesh sieve(GBT6003.1-1997) to obtain spherical or spherical-like layered cathode material for lithium-ion battery C2.

The cathode material C2 was subjected to a scanning electron microscope test. The particles were found to be spherical or spherical-like shape, comprising primary particles and secondary particles agglomerated by the primary particles. The number percentage of the secondary particles agglomerated by the primary particles is 18%.

The powder of the cathode material C2 was subjected to X-ray diffraction test. The test results showed that full width at half maximum FWHM (110) of (110) diffraction peak at a diffraction angle 2θ of about 64.89° was 0.105. Full width at half maximum FWHM (104) of (104) diffraction peak at a diffraction angle 2θ of about 44.42° was 0.087, the crystalline grain size was 1859 Å, and full width at half maximum FWHM (101) of (101) diffraction peak at a diffraction angle 2θ of about 36.68° was 0.05, full width at half maximum FWHM (107) of (107) diffraction peak at a diffraction angle 2θ of about 58.64° was 0.099, the crystalline grain size was 1894 Å. The ratio of full width at half maximum FWHM (003) of (003) diffraction peak at a diffraction angle 2θ of about 18.70° to full width at half maximum FWHM (104) of (104) diffraction peak at a diffraction angle 2θ of about 44.42° was 1.21.

Specifically, the conditions (sintering temperature, sintering time, and product) corresponding to the sintering step of the cathode material C2 were summarized in Table 1, as shown in Table 1. The index data of the cathode material C2 (full width at half maximum of diffraction angle of (110) crystal plane in X-ray diffraction, diffraction angle of (003) plane, full width at half maximum of diffraction angle of (104) crystal plane and crystalline grain size, full width at half maximum of diffraction angle of (101) crystal plane, full width at half maximum of diffraction angle of the (107) crystal plane and the crystalline grain size, the ratio of FWHM (003)/FWHM (104)) were shown in Table 2. The performance test results of the battery using the powder C2 as the active material of the cathode material were shown in Table 3.

EXAMPLE 3

1) 3.4 g of zirconium oxide and 1.4 g magnesium oxide powder was dissolved in 80 ml aqueous solution of 5 wt % surfactant cetyltrimethyl ammonium bromide to form a first solution.

2) 459.6 g of lithium hydroxide was dispersed into 200 ml polyethylene glycol water-based colloid with a mass concentration of 1%, and stirred for 45 min at a rotation speed of 380 r/min to form a second solution.

3) the second solution formed by the above step 2) was added to a container and stirred, then added 1000 g of NiCoMn622 hydroxide and stirred for 50 min at a rotation speed of 200 r/min, finally added the first solution of step 1) and stirred continuously for 18 min, and a mixture containing elements of lithium, nickel, cobalt, manganese and zirconium was obtained.

4) Under oxygen atmosphere, the mixture containing elements of lithium, nickel, cobalt, manganese and zirconium of step 3) was heated from room temperature by temperature elevation for 3.5 h to 850° C. to sinter for 2 h, and then heated by temperature elevation for 1.5 h to 930° C. to sinter for 28 h. The mixture was naturally cooled to room temperature. Then the mixture was crushed and classified at an air pressure of 0.6 Mpa, and then the mixture was sieved with a 325 mesh sieve (GBT6003.1-1997) to obtain spherical or spherical-like layered cathode material for lithium-ion battery C3.

The cathode material C3 was subjected to a scanning electron microscope test. The particles were found to be spherical or spherical-like shape, comprising primary particles and secondary particles agglomerated by the primary particles. The number percentage of the secondary particles agglomerated by the primary particles is 10%.

The powder of the cathode material C3 was subjected to X-ray diffraction test. The test results showed that full width at half maximum FWHM (110) of (110) diffraction peak at a diffraction angle 2θ of about 64.90° was 0.098. Full width at half maximum FWHM (104) of (104) diffraction peak at a diffraction angle 2θ of about 44.43° was 0.097, the crystalline grain size was 1682 Å, and full width at half maximum FWHM (101) of (101) diffraction peak at a diffraction angle 2θ of about 36.7° was 0.10, full width at half maximum FWHM (107) of (107) diffraction peak at a diffraction angle 2θ of about 58.59° was 0.12, the crystalline grain size was 2492 Å. The ratio of full width at half maximum FWHM (003) of (003) diffraction peak at a diffraction angle 2θ of about 18.72° to full width at half maximum FWHM (104) of (104) diffraction peak at a diffraction angle 2θ of about 44.43° was 1.50.

Specifically, the conditions (sintering temperature, sintering time, and product) corresponding to the sintering step of the cathode material C3 were summarized in Table 1, as shown in Table 1. The index data of the cathode material C3 (full width at half maximum of diffraction angle of (110) crystal plane in X-ray diffraction, diffraction angle of (003) plane, full width at half maximum of diffraction angle of (104) crystal plane and crystalline grain size, full width at half maximum of diffraction angle of (101) crystal plane, full width at half maximum of diffraction angle of the (107) crystal plane and the crystalline grain size, the ratio of FWHM (003)/FWHM (104)) were shown in Table 2. The performance test results of the battery using the powder C3 as the active material of the cathode material were shown in Table 3.

EXAMPLE 4

1) 0.07 g of ammonium metatungstate powder particles were dissolved in 50 ml aqueous solution of 3 wt % surfactant cetyltrimethyl ammonium bromide to form a first solution.

2) 510.1 g of lithium carbonate was dispersed into 300 ml polyethylene glycol water-based colloid with a mass concentration of 2.5%, and stirred for 50 min at a rotation speed of 500 r/min to form a second solution.

3) the second solution formed by the above step 2) was added to a container and stirred, then added 1000 g of NiCoMn433 hydroxide and stirred for 60 min at a rotation speed of 300 r/min, finally added the first solution of step 1) and stirred continuously for 10 min, and a mixture containing elements of lithium, nickel, cobalt, manganese and tungsten was obtained.

4) Under oxygen atmosphere, the mixture containing elements of lithium, nickel, cobalt, manganese and tungsten of step 3) was heated from room temperature by temperature elevation for 2.5 h to 750° C. to sinter for 4 h, and then heated by temperature elevation for 1.5 h to 1080° C. to sinter for 2 h. The mixture was naturally cooled to room temperature. Then the mixture was crushed and classified at an air pressure of 0.9 Mpa, and then the mixture was sieved with a 325 mesh sieve (GBT6003.1-1997) to obtain spherical or spherical-like layered cathode material for lithium-ion battery C4.

The cathode material C4 was subjected to a scanning electron microscope test. The particles were found to be spherical or spherical-like shape, comprising primary particles and secondary particles agglomerated by the primary particles. The number percentage of the secondary particles agglomerated by the primary particles is 8%.

The powder of the cathode material C4 was subjected to X-ray diffraction test. The test results showed that full width at half maximum FWHM (110) of (110) diffraction peak at a diffraction angle 2θ of about 64.88° was 0.07. Full width at half maximum FWHM (104) of (104) diffraction peak at a diffraction angle 2θ of about 44.46° was 0.105, the crystalline grain size was 2000 Å, and full width at half maximum FWHM (101) of (101) diffraction peak at a diffraction angle 2θ of about 36.71° was 0.08, full width at half maximum FWHM (107) of (107) diffraction peak at a diffraction angle 2θ of about 59.1° was 0.083, the crystalline grain size was 3000 Å. The ratio of full width at half maximum FWHM (003) of (003) diffraction peak at a diffraction angle 2θ of about 18.64° to full width at half maximum FWHM (104) of (104) diffraction peak at a diffraction angle 2θ of about 44.46° was 1.08.

Specifically, the conditions (sintering temperature, sintering time, and product) corresponding to the sintering step of the cathode material C4 were summarized in Table 1, as shown in Table 1. The index data of the cathode material C4 (full width at half maximum of diffraction angle of (110) crystal plane in X-ray diffraction, diffraction angle of (003) plane, full width at half maximum of diffraction angle of (104) crystal plane and crystalline grain size, full width at half maximum of diffraction angle of (101) crystal plane, full width at half maximum of diffraction angle of the (107) crystal plane and the crystalline grain size, the ratio of FWHM (003)/FWHM (104)) were shown in Table 2. The performance test results of the battery using the powder C4 as the active material of the cathode material were shown in Table 3.

COMPARATIVE EXAMPLE 1

Using the same ratio as in Example 1, but the experimental method is different:

441.5 g of lithium carbonate, 5 g of alumina powder and 1000 g of nickel-cobalt-manganese hydroxide with a molar ratio of Ni:Co:Mn=5:2:3 were ball milled for 50 min at a rotation speed of 300 rpm and mixed uniformly and discharged, the mixture was then placed into a muffle furnace. In an air atmosphere, the mixture was heated by temperature elevation for 3 h to 800° C. to sinter for 3 h, and then heated by temperature elevation for 1 h to 980° C. to sinter for 5 h. The mixture was naturally cooled to room temperature. Then the mixture was crushed and classified, and then the mixture was sieved with a 325 mesh sieve (GBT6003.1-1997) to obtain spherical or spherical-like layered cathode material for lithium-ion battery D1.

Figure 2A:
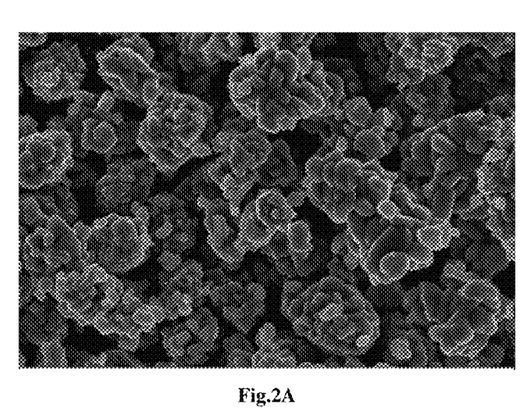
FIG. 2A is a SEM photograph of the cathode material of comparative example 1 which the magnification is 3,000 times.

The cathode material D1 was subjected to a scanning electron microscope test, as shown in FIG. 2A, the entire particles were found to be spherical or spherical-like secondary particles.

Figure 2B:
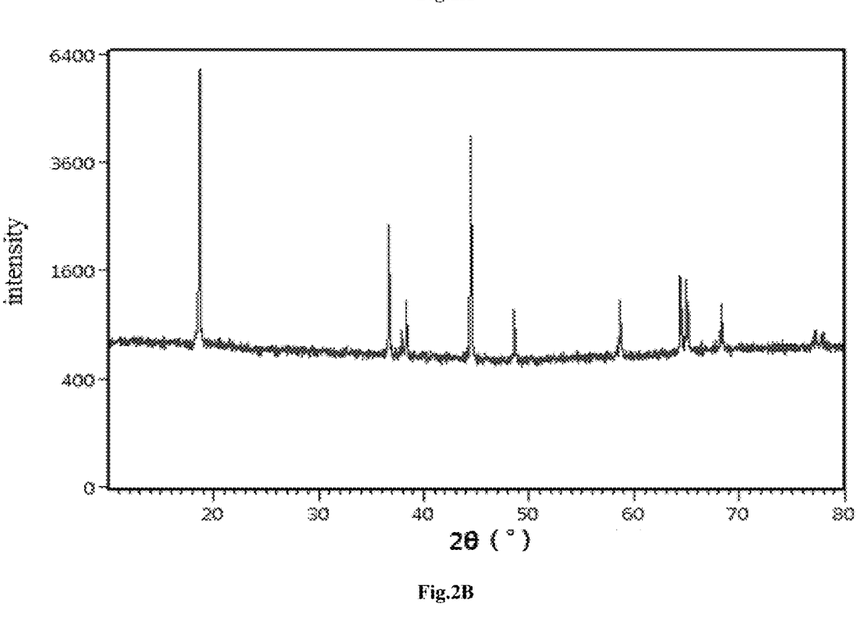
FIG. 2B is an X-ray spectrum of the cathode material of comparative example 1.

The powder of the cathode material D1 was subjected to X-ray diffraction test, as shown in FIG. 2B, the test results showed that full width at half maximum FWHM (110) of (110) diffraction peak at a diffraction angle 2θ of about 64.96° was 0.15. Full width at half maximum FWHM (104) of (104) diffraction peak at a diffraction angle 2θ of about 44.44° was 0.12, the crystalline grain size was 2300 Å, and full width at half maximum FWHM (101) of (101) diffraction peak at a diffraction angle 2θ of about 36.72° was 0.12, full width at half maximum FWHM (107) of (107) diffraction peak at a diffraction angle 2θ of about 58.68° was 0.130, the crystalline grain size was 3300 Å. The ratio of full width at half maximum FWHM (003) of (003) diffraction peak at a diffraction angle 2θ of about 18.66° to full width at half maximum FWHM (104) of (104) diffraction peak at a diffraction angle 2θ of about 44.44° was 1.58.

Specifically, the conditions (sintering temperature, sintering time, and product) corresponding to the sintering step of the cathode material D1 were summarized in Table 1, as shown in Table 1. The index data of the cathode material D1 (full width at half maximum of diffraction angle of (110) crystal plane in X-ray diffraction, diffraction angle of (003) plane, full width at half maximum of diffraction angle of (104) crystal plane and crystalline grain size, full width at half maximum of diffraction angle of (101) crystal plane, full width at half maximum of diffraction angle of the (107) crystal plane and the crystalline grain size, the ratio of FWHM (003)/FWHM (104)) are shown in Table 2. The performance test results of the battery using the powder D1 as the active material of the cathode material were shown in Table 3.

COMPARATIVE EXAMPLE 2

Using the same experimental method as in Example 2 except that the raw materials were different:

1) 0.6 g of ammonium heptamolybdate powder particles were dissolved in 100 ml aqueous solution of 10 wt % surfactant cetyltrimethyl ammonium bromide to form a first solution.

2) 456.7 g of lithium carbonate was dispersed into 100 ml polyethylene glycol water-based colloid with a mass concentration of 3%, and stirred for 35 min at a rotation speed of 250 r/min to form a second solution.

3) the second solution formed by the above step 2) was added to a container and stirred, then added 1000 g of NiCoMn333 hydroxide and stirred for 40 min at a rotation speed of 100 r/min, finally added the first solution of step 1) and stirred continuously for 10 min, and a mixture containing lithium, nickel, cobalt and manganese was obtained.

4) Under air atmosphere, the mixture containing lithium, nickel, cobalt and manganese of step 3) was heated from room temperature by temperature elevation for 2 h to 700° C. to sinter for 5 h, and then heated by temperature elevation for 1.5 h to 940° C. to sinter for 19 h. The mixture was naturally cooled to room temperature. Then the mixture was crushed and classified, and then the mixture was sieved with a 325 mesh sieve(GBT6003.1-1997) to obtain spherical or spherical-like layered cathode material for lithium-ion battery D2.

The cathode material D2 was subjected to a scanning electron microscope test. The particles were found to be spherical or spherical-like shape, comprising primary particles and secondary particles agglomerated by the primary particles. The number percentage of the secondary particles agglomerated by the primary particles is 45%.

The powder of the cathode material D2 was subjected to X-ray diffraction test. The test results showed that full width at half maximum FWHM (110) of (110) diffraction peak at a diffraction angle 2θ of about 64.85° was 0.05. Full width at half maximum FWHM (104) of (104) diffraction peak at a diffraction angle 2θ of about 44.40° was 0.054, the crystalline grain size was 850 Å, and full width at half maximum FWHM (101) of (101) diffraction peak at a diffraction angle 2θ of about 36.66° was 0.04, full width at half maximum FWHM (107) of (107) diffraction peak at a diffraction angle 2θ of about 58.63° was 0.059, the crystalline grain size was 920 Å. The ratio of full width at half maximum FWHM (003) of (003) diffraction peak at a diffraction angle 2θ of about 18.69° to full width at half maximum FWHM (104) of (104) diffraction peak at a diffraction angle 2θ of about 44.43° was 0.84.

Specifically, the conditions (sintering temperature, sintering time, and product) corresponding to the sintering step of the cathode material D2 were summarized in Table 1, as shown in Table 1. The index data of the cathode material D2 (full width at half maximum of diffraction angle of (110) crystal plane in X-ray diffraction, diffraction angle of (003) plane, full width at half maximum of diffraction angle of (104) crystal plane and crystalline grain size, full width at half maximum of diffraction angle of (101) crystal plane, full width at half maximum of diffraction angle of the (107) crystal plane and the crystalline grain size, the ratio of FWHM (003)/FWHM (104)) were shown in Table 2. The performance test results of the battery using the powder D2 as the active material of the cathode material were shown in Table 3.

COMPARATIVE EXAMPLE 3

1.04 mol of mono-hydrate lithium hydroxide was dispersed in 600 ml of acrylamide water-based colloid with a mass concentration of 5% to obtain a mixture, and then stirred the mixture at a rotation speed of 55 rpm for 90 minutes to prepare a colloid. Then the carboxy oxides of nickel-cobalt-manganese precursors with a molar ratio of Ni:Co:Mn=5:2:3 was added to the colloid according to the molar ratio of Li:(Ni+Co+Mn)=1.04:0.998 to obtain a mixture, and then stirred the mixture at a rotation speed of 2000 rpm for 30 minutes to obtain mixed materials. And under air atmosphere, the mixed materials were placed into a muffle furnace and pre-sintered at 800° C. at a heating rate of 15° C./min for 4 hours, then the mixed materials were cooled to room temperature, and then under air atmosphere, the mixed materials were sintered again at 980° C. at a heating rate of 17° C./min for 8 hours, then the mixed materials were cooled to room temperature. Then the mixed materials were pulverized, and a lithium-nickel-cobalt-manganese composite oxide cathode material intermediate product A was obtained, and put aside. 0.002 mol tetrabutyl titanate was added to 0.2 mol of isopropanol and stirred for 10 min to obtain a solution B containing titanium element, and put aside. The organic solution B was added to the lithium-nickel-cobalt-cobalt-manganese cathode material intermediate product A, and stirred for 30 min to obtain a mixture C, then the mixture C was placed into a muffle furnace, and sintered at 960° C. at a heating rate of 15° C./min for 4 hours under air atmosphere. The sintered mixture C was cooled to room temperature, and pulverized to obtain a spherical or spherical-like layered cathode material D3 for lithium-ion battery.

The powder of the cathode material D3 was subjected to X-ray diffraction test. The test results showed that full width at half maximum FWHM (110) of (110) diffraction peak at a diffraction angle 2θ of about 64.92° was 0.073. Full width at half maximum FWHM (104) of (104) diffraction peak at a diffraction angle 2θ of about 44.39° was 0.108, the crystalline grain size was 2090 Å, and full width at half maximum FWHM (101) of (101) diffraction peak at a diffraction angle 2θ of about 36.67° was 0.110, full width at half maximum FWHM (107) of (107) diffraction peak at a diffraction angle 2θ of about 58.58° was 0.123, the crystalline grain size was 3085 Å. The ratio of full width at half maximum FWHM (003) of (003) diffraction peak at a diffraction angle 2θ of about 18.65° to full width at half maximum FWHM (104) of (104) diffraction peak at a diffraction angle 2θ of about 44.39° was 1.52.

The index data of the cathode material D3 (full width at half maximum of diffraction angle of (110) crystal plane in X-ray diffraction, diffraction angle of (003) plane, full width at half maximum of diffraction angle of (104) crystal plane and crystalline grain size, full width at half maximum of diffraction angle of (101) crystal plane, full width at half maximum of diffraction angle of the (107) crystal plane and the crystalline grain size, the ratio of FWHM (003)/FWHM (104)) were shown in Table 2. The performance test results of the battery using the powder D3 as the active material of the cathode material were shown in Table 3.

TABLE 1 sintering process parameters of the cathode material in the examples

| Example | Heating Rate h | Sintering Temperature ° C. | Sintering Time h | Atmosphere | Heating time h | Sintering Temperature ° C. | Sintering Time h | Product / |
|---|---|---|---|---|---|---|---|---|
| Example 1 | 3 | 800 | 3 | Air | 1 | 980 | 5 | C1 |
| Example 2 | 2 | 700 | 5 | Air | 2 | 940 | 19 | C2 |
| Example 3 | 3.5 | 850 | 2 | Oxygen | 1.5 | 930 | 28 | C3 |
| Example 4 | 2.5 | 750 | 4 | Air | 2.5 | 1080 | 2 | C4 |
| Comparative Example 1 | 3 | 800 | 3 | Air | 1 | 980 | 5 | D1 |
| Comparative Example 2 | 2 | 700 | 5 | Air | 2 | 940 | 19 | D2 |

TABLE 2 results of X-ray diffraction test of the cathode material in the examples

| Example | 110 2θ | FWHM 110 | 003 2θ | 104 2θ | FWHM 104 | Grain Size 104 | 101 2θ | FWHM 101 | 107 2θ | FWHM 107 | Grain Size 107 | FWHM 003/104 |
|---|---|---|---|---|---|---|---|---|---|---|---|---|
| Example 1 | 64.92 | 0.130 | 18.68 | 44.41 | 0.060 | 1100 | 36.64 | 0.070 | 58.61 | 0.065 | 1000 | 0.90 |
| Example 2 | 64.89 | 0.105 | 18.70 | 44.42 | 0.087 | 1859 | 36.68 | 0.050 | 58.64 | 0.099 | 1894 | 1.21 |
| Example 3 | 64.90 | 0.098 | 18.72 | 44.43 | 0.097 | 1682 | 36.70 | 0.100 | 58.59 | 0.120 | 2492 | 1.50 |
| Example 4 | 64.88 | 0.070 | 18.64 | 44.46 | 0.105 | 2000 | 36.71 | 0.080 | 59.10 | 0.083 | 3000 | 1.08 |
| Comparative Example 1 | 64.96 | 0.150 | 18.66 | 44.44 | 0.120 | 2300 | 36.72 | 0.120 | 58.68 | 0.130 | 3300 | 1.58 |
| Comparative Example 2 | 64.85 | 0.050 | 18.69 | 44.40 | 0.054 | 850 | 36.66 | 0.040 | 58.63 | 0.059 | 920 | 0.84 |
| Comparative Example 3 | 64.92 | 0.073 | 18.65 | 44.39 | 0.108 | 2090 | 36.67 | 0.110 | 58.58 | 0.123 | 3085 | 1.52 |

TABLE 3 performance test results of batteries prepared by the cathode material in examples

| | CR2430 | | | |
|---|---|---|---|---|
| Example | 4.2-3.0 V 0.1 C Capacity (mAh/g) | 4.2-3.0 V 0.1 C First efficiency (%) | 454261 4.2-3.0 V 1.0 C Capacity (mAh/g) | 454261 4.4 V 85°/4 h Thickness Change % |
| Example 1 | 156 | 88.4 | 153 | 101 |
| Example 2 | 153 | 87.6 | 150 | 98 |
| Example 3 | 162 | 89.5 | 159 | 77 |
| Example 4 | 149 | 86.5 | 141 | 55 |
| Comparative Example 1 | 147 | 87.1 | 136 | 125 |
| Comparative Example 2 | 145 | 85.1 | 139 | 113 |
| Comparative Example 3 | 152 | 86.2 | 150 | 142 |

It can be seen from the comparison of the comparative examples and examples in Table 2 and Table 3 that the different preparation methods have different effects on the properties of the cathode material, and the specific capacity of the cathode material obtained by the present invention is relatively high. It can be seen from the comparison of the high temperature storage performance, the thickness change of the cathode material is obviously superior to the comparative examples. It can be seen that the lithium battery prepared by the obtained cathode material has high specific capacity, good high temperature stability and safety, the preparation method thereof is simple and cost is relatively low, and the cathode material has a broad application prospect.

The invention claimed is:

1. A spherical cathode material for lithium-ion battery, characterized in that the chemical formula of the cathode material is $Li_aNi_xCo_yMn_zM_bO_2$, wherein: $1.02 \leq a \leq 1.20$; $0.0 \leq b \leq 0.5$; $0.30 \leq x \leq 0.60$; $0.20 \leq y \leq 0.40$; $0.05 \leq z \leq 0.50$; $x+y+z=1$; M is one or two or more selected from the group consisting of Mg, Ti, Al, Y, Co, Mn, Ni, Ba and rare earth elements; under the scanning electron microscope, the cathode material comprises primary particles with a morphology of spherical shape, and secondary particles agglomerated by the primary particles; the number percentage of the secondary particles is less than or equal to 30% of the total number of particles in the cathode material, wherein in the powder X-ray diffraction spectrum of the cathode material, full width at half maximum FWHM (110) of (110) diffraction peak at a diffraction angle 2θ of about 64.9° is 0.07 to 0.13.

2. The cathode material of claim 1, wherein, $0 \leq b \leq 0.1$.

3. The cathode material of claim 1, wherein, $0 \leq b \leq 0.01$.

4. The cathode material of claim 1, wherein, the number percentage of the secondary particles is less than or equal to 20% of the total number of particles in the cathode material.

5. The cathode material of claim 2, wherein, the number percentage of the secondary particles is less than or equal to 20% of the total number of particles in the cathode material.

6. The cathode material of claim 4, wherein, the number percentage of the secondary particles is less than or equal to 10% of the total number of particles in the cathode material.

7. The cathode material of claim 1, wherein in the powder X-ray diffraction spectrum of the cathode material, full width at half maximum FWHM (104) of (104) diffraction peak at a diffraction angle 2θ of about 44.5° is 0.060 to 0.105, and a crystalline grain size is greater than 1100 Å and less than 2000 Å.

8. The cathode material of claim 4, wherein in the powder X-ray diffraction spectrum of the cathode material, full width at half maximum FWHM (104) of (104) diffraction peak at a diffraction angle 2θ of about 44.5° is 0.060 to 0.105, and a crystalline grain size is greater than 1100 Å and less than 2000 Å.

9. The cathode material of claim 1, wherein in the powder X-ray diffraction spectrum of the cathode material, full width at half maximum FWHM (107) of (107) diffraction peak at a diffraction angle 2θ of about 58.7° is 0.065 to 0.120, and a crystalline grain size is greater than 1000 Å and less than 3000 Å.

10. The cathode material of claim 4, wherein in the powder X-ray diffraction spectrum of the cathode material, full width at half maximum FWHM (107) of (107) diffraction peak at a diffraction angle 2θ of about 58.7° is 0.065 to 0.120, and a crystalline grain size is greater than 1000 Å and less than 3000 Å.

11. The cathode material of claim 1, wherein in the powder X-ray diffraction spectrum of the cathode material, the ratio of full width at half maximum FWHM (003) of (003) diffraction peak at a diffraction angle 2θ of about 18.7° to full width at half maximum FWHM (104) of (104) diffraction peak at a diffraction angle 2θ of about 44.5° is in the range of 0.90 to 1.50.

12. The cathode material of claim 1, wherein in the powder X-ray diffraction spectrum of the cathode material, full width at half maximum FWHM (101) of (101) diffraction peak at a diffraction angle 2θ of about 36.7° is 0.05 to 0.10.

13. A lithium-ion battery, characterized in that, the battery comprises the cathode material of claim 1.

14. A communication, electric power, energy storage system or a mobile storage device, which is prepared by using the lithium-ion battery of claim 13.

* * * * *